3,098,419
MONOCULAR MIRROR REFLEX CAMERA WITH
BETWEEN-THE-LENS SHUTTER
Hans-Joachim Daeche, Dresden, Germany, assignor to VEB Kamera- und Kinowerke Dresden, Dresden, Germany
Filed May 9, 1960, Ser. No. 27,845
4 Claims. (Cl. 95—42)

The invention concerns a monocular mirror reflex camera having a between-the-lens shutter, hinged mirror and a similarly movable covering flap, wherein the hinged mirror and the covering flap protect the photographic film against the influence of light, when the hinged mirror is situated in the observation position and the between-the-lens shutter is opened.

Constructions are already known in which, for purpose of preventing the passage of light to the film in the camera when the hinged mirror is made as short as possible, diaphragms are attached to the housing which cover the space around the mirror and thus exclude the light.

Other constructions which have become known provide a flap which extends over the hinged mirror and thus serves as a stop for the latter.

These known solutions have various disadvantages. The first is unsuitable for objective lenses with large aperture, since the diaphragm fast with the housing, against which the hinged mirror rests with its lower edge, would lie in the region of the light cone during the picture taking. The disadvantage of the second of the known solutions consists in the unreliability of the light covering. As soon as the position of the hinged mirror is readjusted a little, its lower edge departs from the overlap and the light can penetrate without hindrance into the space situated behind the hinged mirror. In both solutions the disadvantages are the same in that the hinged mirror is advanced from the observation position after its release, by means of a spring and thereby strikes with full force against the image window of the focussing screen. The kinetic energy of the mirror is taken up unilaterally and the vibration caused brings with it the danger that a photograph taken immediately afterwards may be blurred.

The invention removes these disadvantages and achieves further advantages due to the fact that both the hinged mirror and also a covering flap possess grooves and projections respectively, which engage in one another when the hinged mirror is in the operative position and form a labyrinth or light seal. In a further development of the invention the hinged mirror and the covering flap are so connected by a coupling element that the housing, the hinged mirror, the covering flap and the coupling element form a quadrilateral linkage, the points of articulation of which form the coupling element on the hinged mirror and on the covering flap lie at least approximately in one plane with the point of articulation of the hinged mirror in the housing, when the hinged mirror is situated in the observation position.

A possible form of embodiment of the invention is to be explained in greater detail by reference to an example hereinafter, from which further features peculiar thereto may be seen. In this description all details have been omitted which are not directly connected with the invention.

Figure 1:
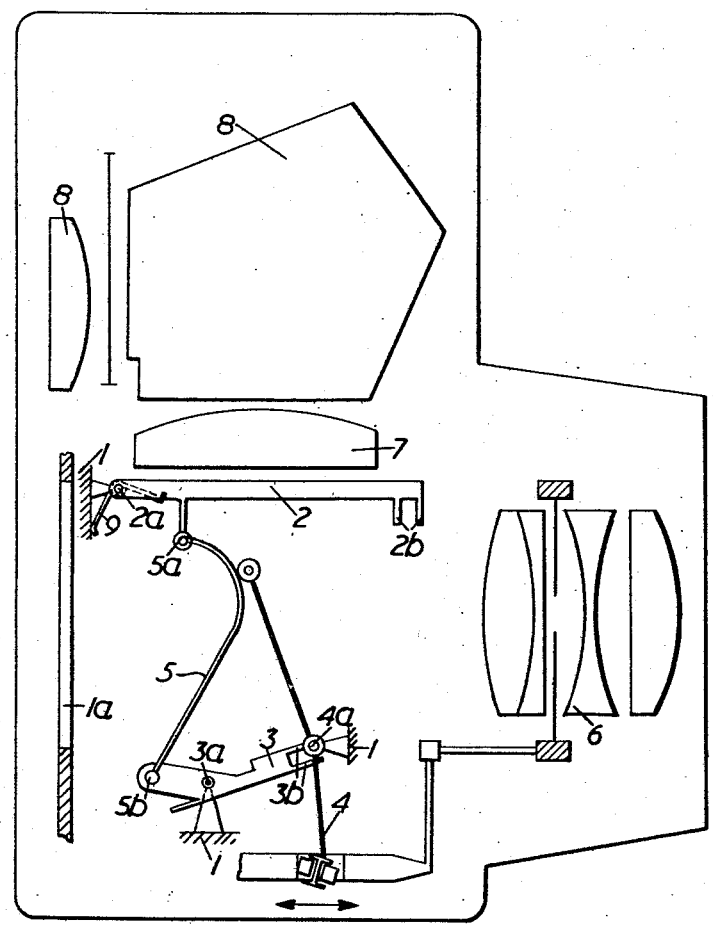
FIGURE 1 shows the lateral elevation of a camera equipped in accordance with the invention, partially in section; the hinged mirror being in the position during and after the exposure.

In a camera housing 1 there are mounted a hinged mirror 2 at 2a, a covering flap 3 at 3a, a cocking lever 4 at 4a, an objective lens 6, a diaphragm, a picture area lens 7, a prismatic viewfinder 8 and a torsion spring 9 also at 2a. A coupling element 5 is articulated at the points 5a to the hinged mirror 2 and 5b to the covering flap 3, and thus completes a quadrilateral linkage otherwise formed by the camera housing 1, the hinged mirror 2 and the covering flap 3. The transmission lever 4 is constructed as a two-armed lever and bears with the outer end of one of its arms upon the coupling element 5, with the outer end of its other arm upon the last member of a cocking mechanism 11 which is also operatively connected to diaphragm 10 in a conventional manner. The torsion spring 9 acts in such a manner upon the hinged mirror that the latter always seeks to adopt the position shown in FIGURE 1 in which it clears the ray path to the film trap 1a. When the hinged mirror 2 and the covering flap 3 are in the operative position, projections 2b of the hinged mirror 2 and the projections 3b of the covering flap 3 engage in one another and form a labyrinth or light seal for the prevention of the penetration of light further along the objective light ray path into the space between the hinged mirror 2 and the film gate 1a, which is formed by the housing 1 (FIGURE 2). The points of articulation 5a and 5b of the coupling element 5 and the pivot point 2a of the hinged mirror 2 lie at least approximately in one plane when the hinged mirror 2 is in this observation position.

During the taking of the picture and in the uncocked state after the picture-taking the hinged mirror 2 and with it the entire quadrilateral linkage 1, 2, 3, 5 and the cocking lever 4 are situated in the position in which the ray path to the film gate 1a is cleared.

Figure 2:
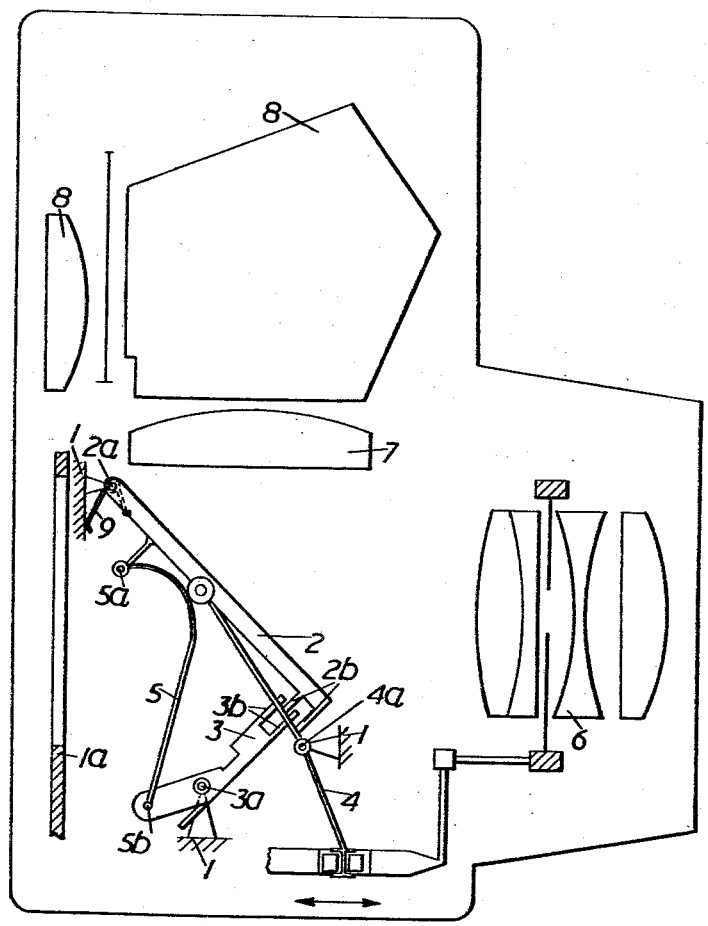
FIGURE 2 shows the elevation as FIGURE 1, with the hinged mirror in observation position.

Derived from the film winding and shutter cocking movement, the cocking lever 4 is moved in the direction of the arrow (FIGURES 1 and 2). In this movement it presses upon the surface of the coupling element 5, which is curved, against the end of one of its arms. The coupling element 5 yields to this pressure and in doing so, through the points of articulation 5a and 5b and against the action of the torsion spring 9, moves the hinged mirror 2 and the covering flap 3 out of the clearance position into the observation position in which they are locked in known manner. Due to the fact that the points 2a, 5a and 5b when in this position lie in one plane, a dead point of the quadrilateral linkage is reached. The covering flap 3, by virtue of these constructional peculiarities, is already situated in its end position before the hinged mirror 2 has been moved so far that the labyrinth-forming projections 2b and 3b can engage in one another. The abovementioned constructional peculiarity further permits an adjustment of the position of the hinged mirror 2 in an observation position, without the covering flap 3 being moved in the adjusting movement and the projections 2b and 3b abutting on one another. Apart from the absolutely secure light covering with the hinged mirror 2 made as short as possible and adjustable—FIGURE 2 shows clearly that a rigid covering in place of the covering flap 3 would cut into the ray path—the construction has a further advantage. Due to the special connection of the parts 2, 3, 4, 5 moved by the torsion spring 9 after release of the locking, it provides an equalization of the effect of their kinetic energy upon the housing 1 at the moment of their abutment in the release position (FIGURE 1). In the release position the hinged mirror 2 places itself before the picture area lens 7 and thus prevents light from entering the camera internal space during the exposure, otherwise than from the objective lens 6, through the prismatic viewfinder 8.

I claim:

1. In a monocular mirror reflux camera having a housing, a between-the-lens shutter mounted in the housing, a cocking mechanism mounted in the housing, a spring-urged mirror hingably mounted in the housing and movable between two opposite end positions, and a covering flap pivotally mounted in the housing, the provision of co-acting shaped portions on the mirror and on the covering flap, a coupling element pivoted to the mirror and to the covering flap, and a two-armed lever pivotally mounted in the housing, the lever being connected to the cocking mechanism at one end and arranged to bear against the coupling element at the other end, the coupling element causing the covering flap to pivot so that said portions engage when the lever is moved by said cocking mechanism, the mirror being moved by the coupling element into the objective light ray path of the camera, said portions forming a light seal to prevent the further passage of light along the objective light ray path, said mirror being urged by said spring toward the other end position out of the objective light ray path.

2. In a monocular reflex camera having a housing, a view finder arranged in the housing, a between-the-lens shutter also mounted in the housing, a shutter cocking mechanism, a film gate on the optical axis of the objective lens, a mirror pivotally mounted in between the objective lens and the film gate and movable between a first position where the mirror lies in the objective light ray path so as to direct the light rays from the objective to the view finder and a second position where the mirror lies out of the objective light ray path, spring means for urging said mirror into its second position, and a covering flap pivotally mounted in the housing and movable between a first position where it cooperates with the mirror to prevent passage of light and a second position where it is clear of the light passage, the provision of a first pair of strips spaced apart by a recess and arranged at the marginal portion of the mirror most remote from the pivotal mounting thereof, said strips lying parallel to each other and to the end edge of the mirror adjacent the marginal portion and extending downwardly from the mirror perpendicular to the plane of the latter, a second pair of strips capable of coacting with said first pair to form a light seal to prevent the passage of stray light when the mirror is in its first position, said strips of the second pair being spaced apart by a recess and arranged at the end edge of the covering flap most remote from the pivotal mounting thereof and lying parallel to each other and to the end edge and extending from the latter parallel to the plane of the covering flap, means connected between the mirror and the covering flap, said means capable of pivoting said covering flap alternately to its first and second positions when the mirror is moved alternately to its first and second positions respectively, and driving means arranged between the shutter cocking mechanism and the mirror to move the mirror into its first position when the shutter is cocked, at which position one strip of one pair enters the recess between the strips of the other pair.

3. In a monocular reflex camera having a housing, a view finder arranged in the housing, a between-the-lens shutter also mounted in the housing, a shutter cocking mechanism, a film gate on the optical axis of the objective lens, a mirror pivotally mounted in between the objective lens and the film gate and movable between a first position where the mirror lies in the objective light ray path so as to direct the light rays from the objective to the view finder and a second position where the mirror lies out of the objective light ray path, spring means for urging said mirror into its second position, and a covering flap pivotally mounted in the housing and movable between a first position where it cooperates with the mirror to prevent passage of light and a second position where it is clear of the light passage, the provision of a first pair of strips spaced apart by a recess and arranged at the marginal portion of the mirror most remote from the pivotal mounting thereof, said strips lying parallel to each other and to the end edge of the mirror adjacent the marginal portion and extending downwardly from the mirror perpendicular to the plane of the latter, a second pair of strips capable of coacting with said first pair to form a light seal to prevent the passage of stray light when the mirror is in its first position, said strips of the second pair being spaced apart by a recess and arranged at the end edge of the covering flap most remote from the pivotal mounting thereof and lying parallel to each other and to the end edge and extending from the latter parallel to the plane of the covering flap, a linkage pivotally connected to the mirror and the covering flap at positions offset from their pivotal mountings respectively, said linkage capable of pivoting said covering flap alternately to its first and second position when the mirror is moved alternately to its first and second positions respectively, and driving means arranged between the shutter cocking mechanism and the mirror to move the mirror into its first position when the shutter is cocked, at which first position one strip of one pair enters the recess between the strips of the other pair and at which first position also the axes of the pivotal connections of the linkage with the mirror and the covering flap lie in one plane together with the axis of one of the pivotal mountings of the mirror and covering flap.

4. In a monocular reflex camera having a housing, a view finder arranged in the housing, a between-the-lens shutter also mounted in the housing, a shutter cocking mechanism, a film gate on the optical axis of the objective lens, a mirror pivotally mounted in between the objective lens and the film gate and movable between a first position where the mirror lies in the objective light ray path so as to direct the light rays from the objective to the view finder and a second position where the mirror lies out of the objective light ray path, spring means for urging said mirror into its second position, and a covering flap pivotally mounted in the housing and movable between the first position where it cooperates with the mirror to prevent passage of light and a second position where it is clear of the light passage, the provision of a first pair of strips spaced apart by a recess and arranged at the marginal portion of the mirror most remote from the pivotal mounting thereof, said strips lying parallel to each other and to the end edge of the mirror adjacent the marginal portion and extending downwardly from the mirror perpendicular to the plane of the latter, a second pair of strips capable of coacting with said first pair to form a light seal to prevent the passage of stray light when the mirror is in its first position, said strips of the second pair being spaced apart by a recess and arranged at the end edge of the covering flap most remote from the pivotal mounting thereof and lying parallel to each other and to the end edge and extending from the latter parallel to the plane of the covering flap, a linkage pivotally connected to the mirror and the covering flap at positions offset from their pivotal mountings respectively, said linkage capable of pivoting said covering flap alternately to its first and second positions when the mirror is moved alternately to its first and second positions respectively, and a two-armed lever pivotally mounted in the housing and arranged between the shutter cocking mechanism and the mirror, the lever being connected to the cocking mechanism at one arm and arranged to bear with its other arm against the linkage to move the mirror into its first position when the shutter is cocked, at which position one strip of one pair enters the recess between the strips of the other pair and at which first position also the axes of the pivotal connections of the linkage with the mirror and the covering flap lie in one plane together with the axis of one of the pivotal mountings of the mirror and covering flap.

References Cited in the file of this patent

UNITED STATES PATENTS

| | | |
|---|---|---|
| 907,486 | Felt | Dec. 22, 1908 |
| 1,388,870 | Lipp | Aug. 30, 1921 |